United States Patent [19]
Broekhuizen et al.

[11] 3,799,700
[45] Mar. 26, 1974

[54] MAIN ROTOR BLADE CONSTRUCTION

[75] Inventors: Willem Broekhuizen, Arlington; Cecil E. Covington, Hurst, both of Tex.

[73] Assignee: Textron Inc., Providence, R.I.

[22] Filed: May 17, 1971

[21] Appl. No.: 143,970

[52] U.S. Cl. .............................. 416/226, 416/233
[51] Int. Cl. ........................................... B64c 27/46
[58] Field of Search ............ 416/226, 223, 233, 232

[56] References Cited
UNITED STATES PATENTS

| | | | |
|---|---|---|---|
| 3,097,982 | 7/1963 | Stoner | 416/233 UX |
| 2,400,649 | 5/1946 | Larsen | 416/226 |
| 3,018,832 | 1/1962 | Prewitt | 416/226 X |
| 3,144,907 | 8/1964 | Lubben et al. | 416/226 UX |
| 3,155,166 | 11/1964 | Stulen et al. | 416/226 |
| 3,217,807 | 11/1965 | Underhill et al. | 416/226 |
| 3,372,757 | 3/1968 | Krohncke | 416/226 X |
| 3,476,625 | 11/1969 | Slivinsky et al. | 416/226 X |
| 3,484,174 | 12/1969 | McCoubrey | 416/226 X |

Primary Examiner—Everette A. Powell, Jr.
Attorney, Agent, or Firm—Richards, Harris & Medlock

[57] ABSTRACT

An aircraft proprotor blade having a leading edge spar with upper and lower after body skins secured at their leading edges to the upper and lower trailing edges, respectively, of the spar and coupled together along the trailing edges thereof. Honeycomb body halves are secured to and are substantially coextensive with each skin. The honeycomb cells are oriented substantially perpendicular to the blade chord plane with confronting ends of the cells intercised and adhesively bonded at the blade chord plane.

6 Claims, 14 Drawing Figures

INVENTORS:
WILLEM BROEKHUIZEN
CECIL E. COVINGTON

*Richards, Harris & Hubbard*
ATTORNEYS

PATENTED MAR 26 1974

INVENTORS:
WILLEM BROEKHUIZEN
CECIL E. COVINGTON

*Richards, Harris & Hubbard*
ATTORNEYS

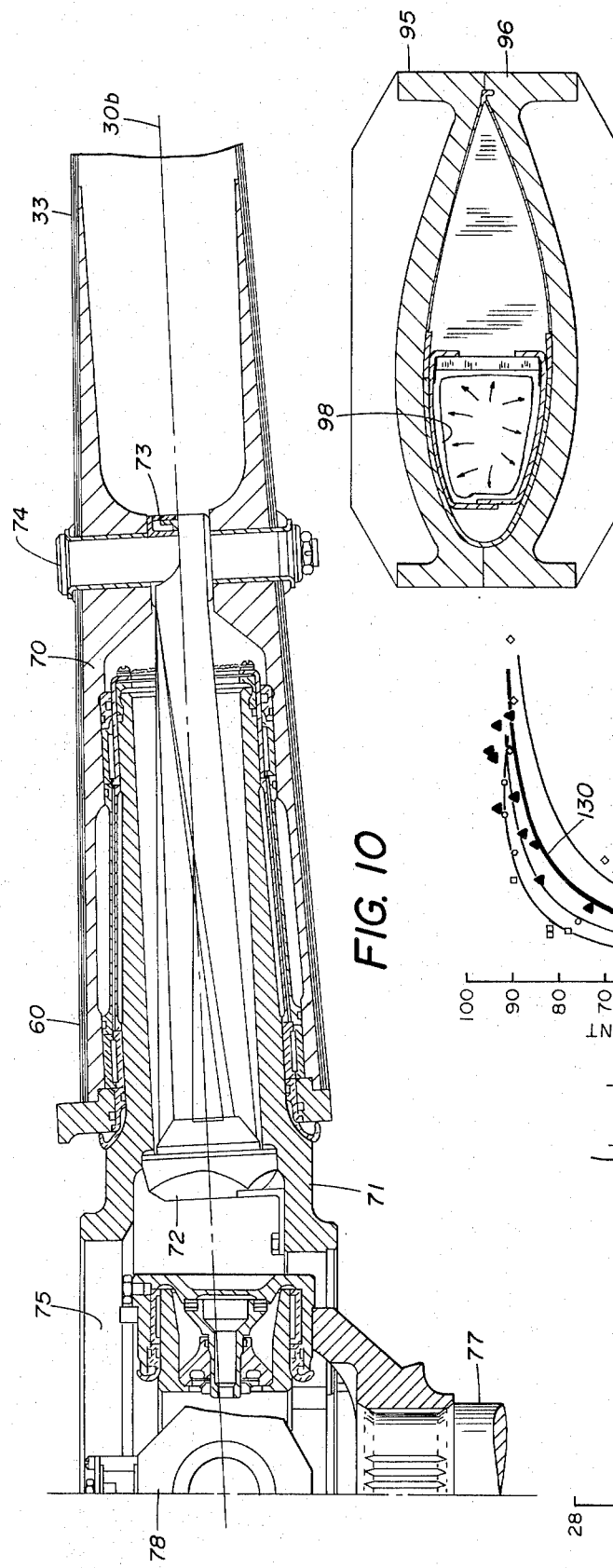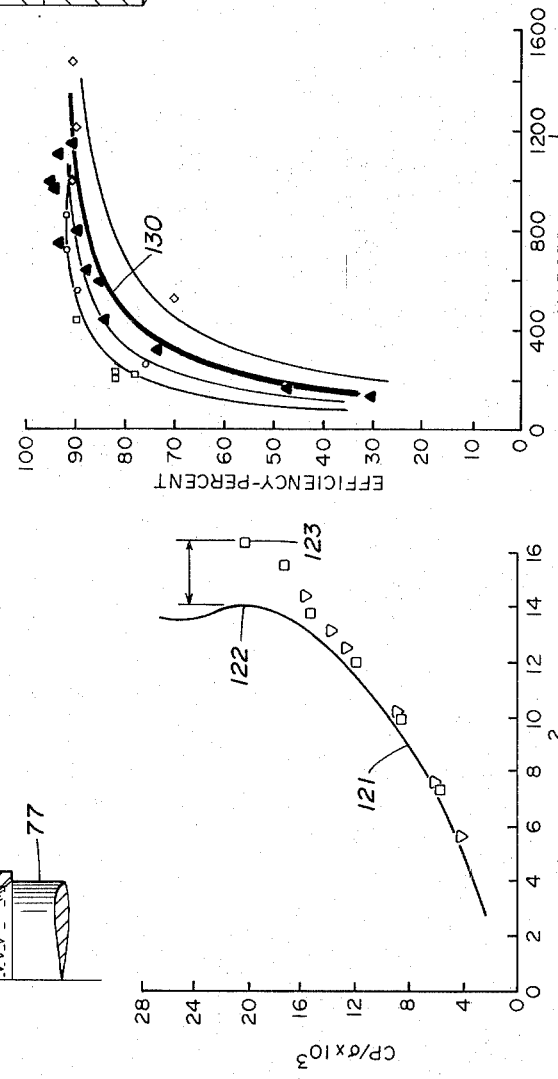

MAIN ROTOR BLADE CONSTRUCTION

This invention relates to a blade for aircraft propulsion such as a convertiplane, and more particularly to a combination of blade members so arranged and assembled that they may reliably be duplicated. In a more specific aspect, the invention relates to the combination of spar and after body sections which form a cavity in which honeycomb section halves are adhesively secured to the upper and lower after body skins and to each other at the blade chord plane with intercision between the halves at the chord plane.

BACKGROUND OF THE INVENTION

Military and civilian air operations contemplate the availability of an aircraft which combines efficient high speed cruise with vertical take-off and landing (VTOL) capability. Military operations must be conducted in all kinds of terrain beyond the range from large air fields. Such aircraft would be of great advantage in military operations. Civil air transportation would be greatly enhanced by the availability of VTOL aircraft operating between city centers as much as 500 miles apart. They would serve to reduce congestion at regional airports by relieving such airports of short haul passengers. Operating between a city center and an airport, such aircraft would shorten the city to airport travel time for the impatient traveler.

In attempts to meet such needs, VTOL aircraft have heretofore been build and tested. The attempts to satisfy the requirements of a high payload vertical lift capability as well as high speed cruise efficiency has led to the development of the present invention and concurrently to the development of a main rotor blade of advanced geometry particularly suitable for such operations.

RELATED APPLICATIONS

The rotor blade geometry disclosed in the present application is described and claimed in application of Harry Edenborough et al. Advanced "Geometry Main Rotor Blade," Ser. No. 143,850, May 17, 1971.

The blade geometry disclosed in said application Ser. No. 143,850 is efficient in both the helicopter and the airplane mode. The blade is twisted in the sense that the zero lift line changes in pitch with distance from the blade root. Further, an aerodynamic twist is achieved by changing the camber of the blade with distance from the root. A change of camber effectively changes the zero lift line of the blade.

In order readily to provide such a blade which may reliably be repeated, construction substantially different than heretofore known is provided. The combination of blade elements and the interrelation therebetween constitutes the present invention. The invention is useful not only in blades having twist and variation in camber, but also in blades of more conventional configuration.

In order to portray the present invention as applied in a preferred mode, the construction will be described in connection with a blade embodying the geometry above discussed.

SUMMARY OF THE INVENTION

In accordance with the present invention, there is provided a proprotor blade having a leading edge spar with upper and lower after body skins secured at their leading edges to the upper and lower trailing edges, respectively, of the spar and coupled together along the trailing edges thereof. Two honeycomb body halves are provided, one secured to and substantially coextensive with each skin. The confronting ends of the honeycomb cells thereof are oriented substantially perpendicular to the blade chord plane and are intercised and adhesively bonded at the blade chord plane.

Preferably the spar is formed of an abrasion strip with an upper spar channel and a lower spar channel and a spar web panel adhesively joined.

Further, the spar web panel is a bounded honeycomb panel whose cell orientation is parallel to the blade chord plane.

In accordance with a further aspect, a root fitting to be coupled to a yoke is adhesively secured within the root portion of the blade.

BRIEF DESCRIPTION OF THE DRAWINGS

For a more complete understanding of the invention, reference may now be had to the following description taken in conjunction with the accompanying drawings in which:

FIG. 10 is a view of the root end of the blade;

FIG. 11 illustrates the manner in which the spar is formed;

FIG. 12 illustrates fabrication and tooling of the blade with the preformed spar as an integral part thereof;

FIG. 13 is a graph illustrative of the hover performance of the blade; and

FIG. 14 is a graph illustrative of the propulsive efficiency of the blade in the airplane mode.

FIG. 1

Referring now to FIG. 1, a convertiplane 10 has been illustrated in which twin three-bladed proprotors, such as the rotor 11, mounted on a pylon 12 are provided for vertical take-off in the helicopter mode and for forward propulsion in an airplane mode of operation.

Preferably, the proprotor 11 is semirigid with the hub gimbal mounted to the pylon mast to provide blade flapping freedom with all of the functional requirements for varying blade pitch and for retention thereof provided.

Fundamental understanding of the proprotor/pylon phenomena has heretofore been gained through construction operation of such craft as the XV-3 convertiplane. Such operations led to further studies, the emergence, and verification of the present invention.

Figure 2:
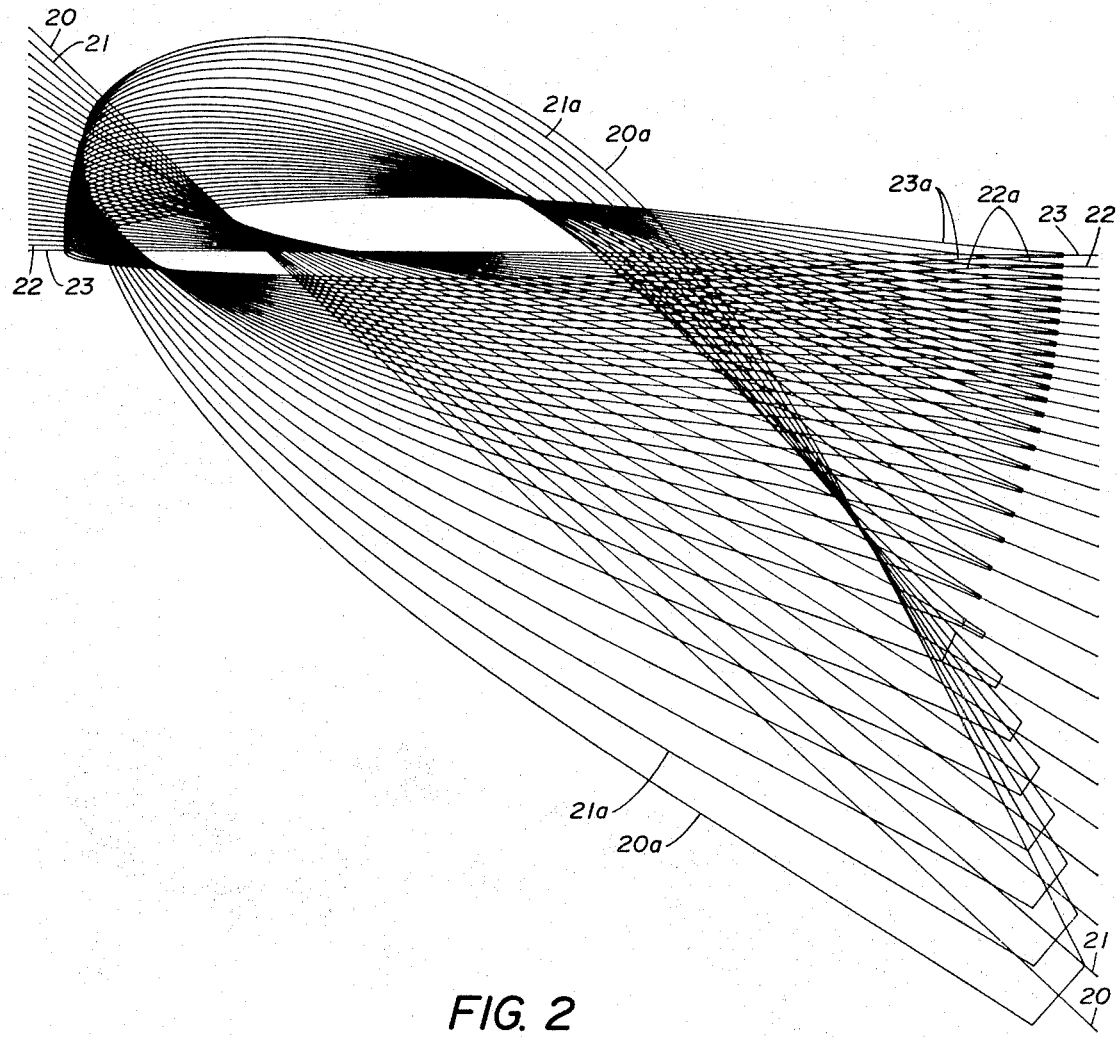
FIG. 2 illustrates the twist and camber of the blade.
Figure 3:
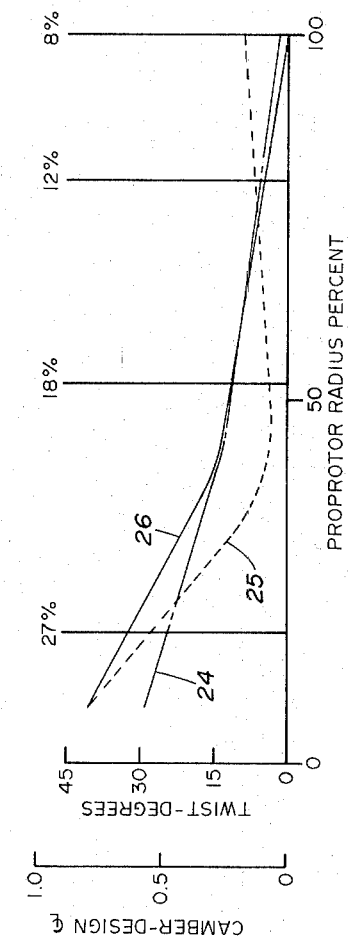
FIG. 3 is a graph, details of which are represented by FIG. 2.

FIGS. 2 and 3

The geometry of a proprotor to which the present construction may be applied is illustrated by FIG. 2 which portrays the twist of the blade and variation in camber. FIG. 2 corresponds with the criteria illustrated in the graphs in FIG. 3. The blade having the configuration illustrated in FIGS. 2 and 3 incorporates the desirable characteristics of a helicopter blade and an airplane propeller. A blade having characteristics illustrated in FIGS. 2 and 3 functions efficiently in its dual role as a helicopter rotor and an airplane propeller. By the present invention it may be constructed as an efficient lightweight proprotor. A blade having the combination of geometrical twist and camber illustrated in FIGS. 2 and 3 meets the aerodynamic requirements for both helicopter and airplane flight and permits the blade spar structure to have a uniform twist rate with an integral grip which eliminates the need for an aerodynamic cuff at the root of the blade and at the same time saves weight and minimizes performance losses.

Twist as used herein refers to the spiral configuration of the blade. Camber is a direct measure of the lack of symmetry of the blade cross section relative to the chord line. If the blade cross section is symmetrical to the chord line, it has zero camber. If the distance from a given point on the chord line to skin surface in one direction is greater than in the other, then camber is present, Camber may be said to introduce an effective twist by shifting the airfoil zero lift line which may add to or subtract from the geometrical twist in control of the total effective twist of a blade and thus tailor the blade to a predetermined performance criteria.

Figure 1:
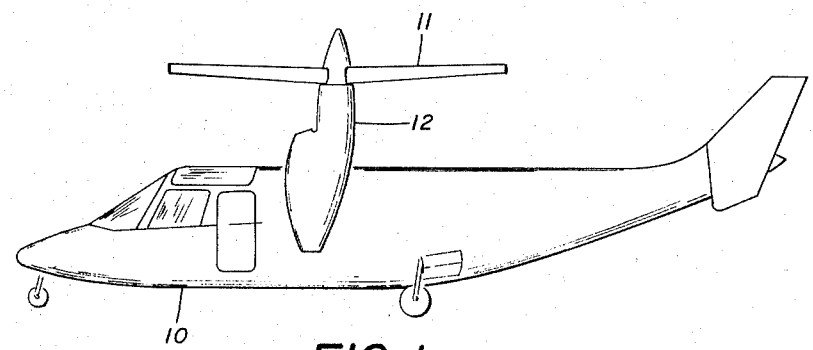
FIG. 1 is a view of a convertiplane to which the blade of the present construction is particularly adapted.

For example, in the embodiment illustrated in FIG. 1, the proprotor system is about 25 feet in diameter. In FIG. 2, a preferred blade geometry is shown. The perimeter and chord line is shown for each of the 31 slices through the blade. The slices are at 5 inch intervals in a blade 150 inches in length.

The blade chord at the root is represented by the line 20. The second blade chord is represented by the line 21. The thirtieth blade chord is represented by the line 22 and the thirty-first blade cord is represented by the line 23. The intermediate blade chords for the other points along the blade are illustrated. The angular variation in the blade chord line indicates that the blade is twisted by about 45° from the root to the tip. From FIG. 3, line 24 shows that the rate of twist with distance is not constant.

Curve 20a corresponds with the outer surface of the blade and thus represents blade configuration at the root. The curve 21a represents the cross-sectional outline of the blade as would be viewed if the blade were sliced 5 inches from the root. In a similar manner, the curve 22a represents the blade configuration 5 inches from the tip. The curve 23a represents blade configuration at the tip.

As above noted, the transition from root to tip is illustrated by the curves of FIG. 3. It will be noted that the twist as illustrated by the curve 24 and the camber as represented by curve 25 both vary nonlinearly with distance from the root. Twist angle is plotted, in degrees, as a function of percentage of the blade length with the zero point taken at the mast center. As to camber, variations in design lift coefficient ($C_L$) are plotted as a function of blade length.

FIGS. 4–10

Figure 4:
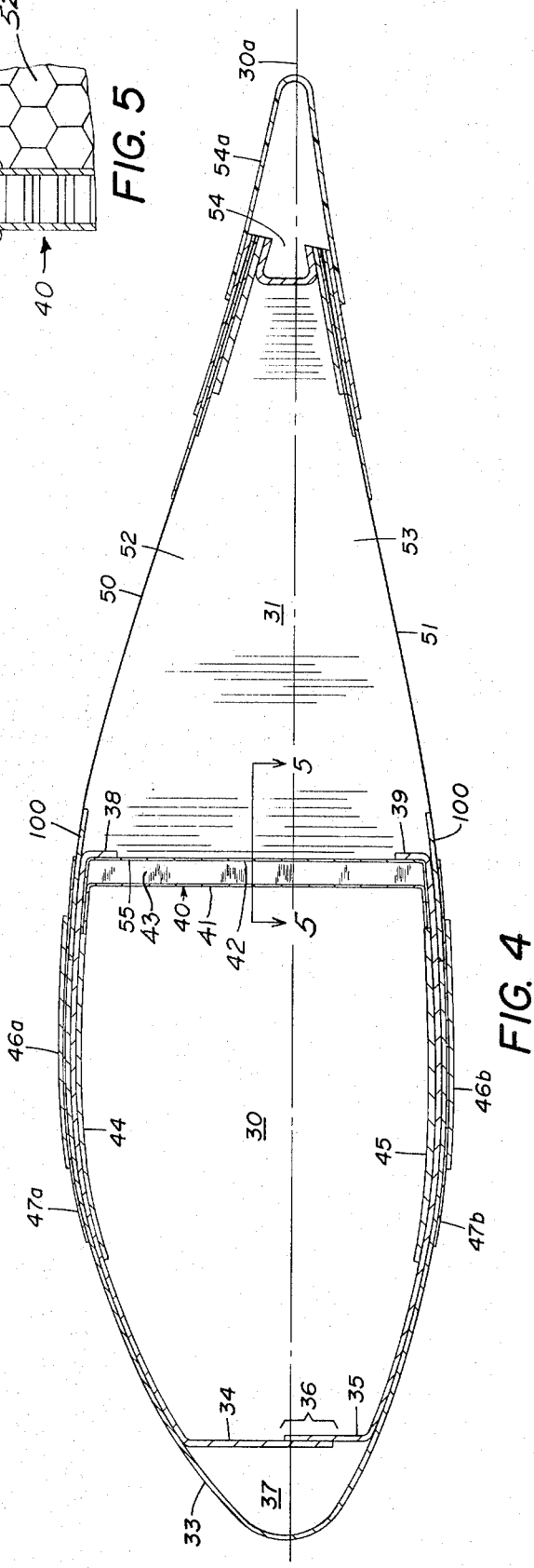
FIG. 4 is a sectional view of the blade taken along lines 4—4 of FIG. 6.

Referring to FIG. 4, a blade having the foregoing characteristics may be formed of two basic elements, a spar 30 and an after body section 31.

Spar 30 comprises an abrasion strip in the form of a curved or U-shaped channel 33. Adhesively secured inside strip 33 are two spar reinforcing channels 34 and 35. The channels overlap in zone 36 to form, with the abrasion strip 33, a front cavity containing a nose block 37. The other flanges of the channels 34 and 35, namely ends 38 and 39, are short and are inwardly turned. A spar web panel 40 is positioned between channels 34 and 35 and is adhesively secured in abutment against the ends 38 and 39.

Figure 5:
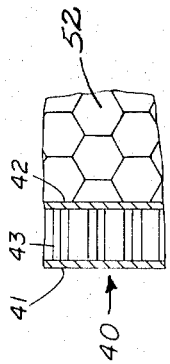
FIG. 5 is a sectional view taken along the lines 5—5 of FIG. 4.

Spar web panel 40 is shown in the enlarged sectional view of FIG. 5. Panel 40 comprises a front skin 41 and a rear skin 42 with a honeycomb spacer unit 43 wherein the honeycomb cells extend parallel to the blade chord 30a. As shown in FIG. 4, the spar 30 further includes an internal doubler strip 44 on the upper inside surface of channel 34 and a doubler strip 45 on the lower inside surface of the channel 35. Further, external doubler strips 46a and 46b are stacked and secured on the upper outer surface of abrasion strip 33. Doubler strips 47a and 47b are stacked and secured on the lower outer surface of the strip 33.

After body unit 31 includes an upper blade skin 50 and a lower blade skin 51. A honeycomb unit 52 is adhesively secured at the upper end thereof to the inner surface of the upper skin 50. A honeycomb unit 53 is adhesively secured to the inner surface of the lower blade skin 51. Cells of the honeycomb units 52 and 53 are oriented substantially perpendicular to the blade chord 30a. A trailing edge construction 54 joins the trailing edges of the skins 50 and 51. A strip 55 of adhesive secures the rear face of the spar web panel 40 to the front of the honeycomb units 52 and 53.

The honeycomb units 52 and 53 are intercised at the plane of the blade chord. The intercised ends of the honeycomb cells are then adhesively secured to each other.

The structure is a unitary all bonded blade with minimum weight. The abrasion strip 33, channels 34 and 35, skins 41 and 42, doublers 44, 45, 46 and 47, and skins 50 and 51 preferably are all of heat treated (17–7 PH) stainless steel. In the above embodiment, the spar web panel skins 41 and 42 and the blade skins 50 and 51 were of 0.008 inch thickness. The abrasion strip 33 was of 0.040 inch thickness and the channels 34 and 35 were of 0.032 inch thickness.

FIG. 6

Figure 6:
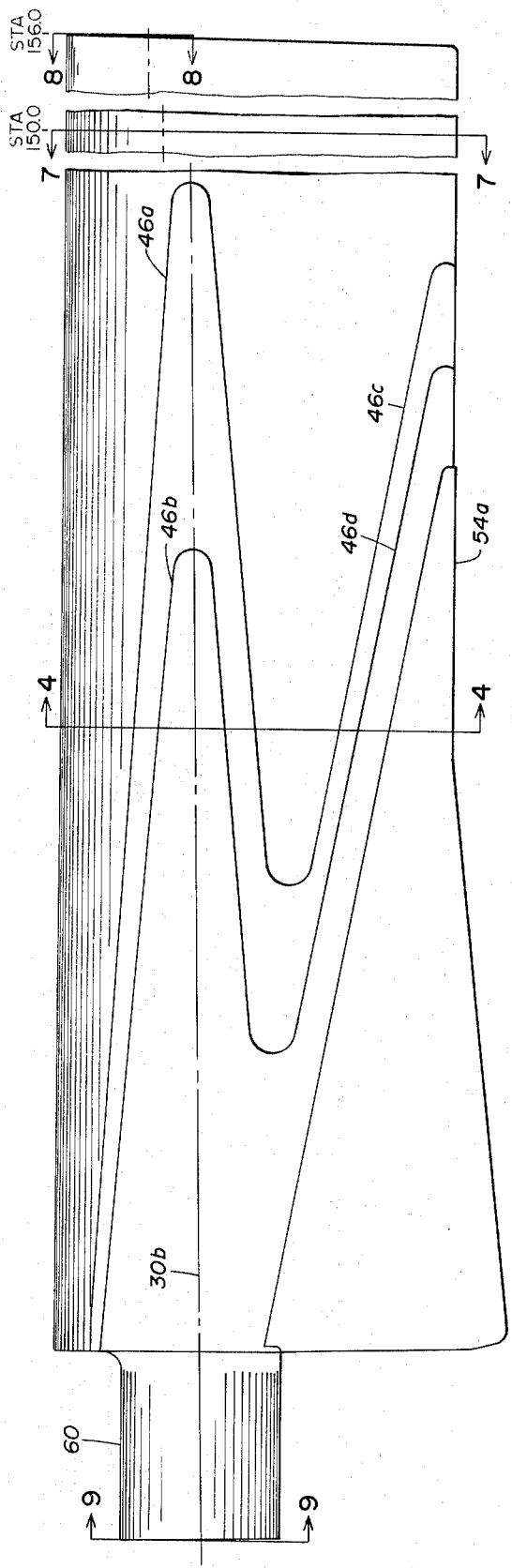
FIG. 6 is a top view of a blade of FIG. 4.

In FIG. 6, the blade has been shown in plan view. An extension 60 of the spar 30 receives a root fitting. Such fitting secured in the end of the spar 30 becomes a unitary part thereof as will be further explained. In the embodiment illustrated, the doubler panels 46a and 46b both extend substantially symmetrical with respect to the line 30b which is the line about which the blade pivots to change pitch. Doubler 46a also has a wing portion 46c extending away from the root to the trailing edge of the blade. Similarly, the doubler 46b has a wing portion 46d extending to the trailing edge of the wing nearer the root.

A fiberglass fairing 54a is bonded onto the trailing edge of the blade. The fairing 54a is shown in section in FIG. 4.

Figure 8:
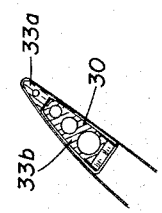
FIG. 8 is a partial sectional view of the blade taken along lines 8—8 of FIG. 6.
Figure 7:
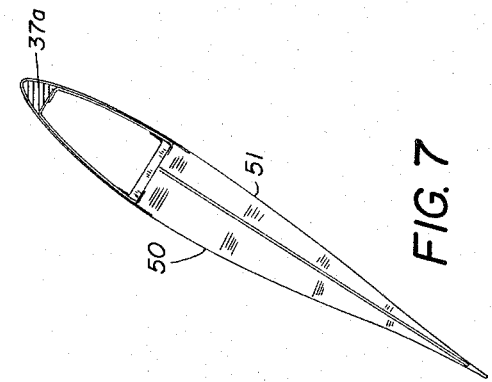
FIG. 7 is a sectional view of the blade taken along lines 7—7 of FIG. 6.

FIGS. 7 and 8

FIG. 7 shows the after body skins 51 and 52 sealed together at the trailing edge. Further, a metallic nose block 37a is provided. At the section line 7—7, FIG. 6, the blade is much thinner than the section shown in FIG. 4. The section shown in FIG. 4 was taken 37.5 inches from the root end of the blade, whereas the section of FIG. 7 was taken 112.5 inches from the root of the blade.

In FIG. 8 the spar only is illustrated with both a nose block 33a and a spar filler block 33b.

Figure 9:
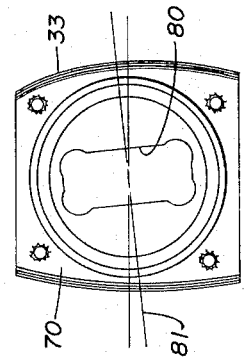
FIG. 9 illustrates the manner in which the blade is coupled to the main mast.

FIGS. 9 and 10

The manner in which attachment is made to the rotor mast is illustrated in FIGS. 9 and 10. It will be noted that a root fitting 70 is bonded into the end of the blade with ends of the abrasion strip 33 extended to enshroud the fitting 70. Strip 33 terminates at the end of the fitting 70. The fitting 70 is adhesively secured in spar 30. Fitting 70 has a tapered inner recess into which a spindle 71 extends. The blade pitch motion is accommodated by suitable needle bearings between spindle 71 and fitting 70. Blade retention is by means of a conventional wire strap unit having a strap fitting 72 with the wires extending around a spool 73 through which a strap pin 74 extends. A yoke assembly 75 having three spindles including spindle 71 is mounted for rotation with the main mast 77 by way of a universal joint assembly 78.

Preferably the yoke assembly is made out of titanium and is of stiffness such that all in-plane and out-of-plane blade frequencies are above rotor speed except the first (rigid body) blade flapping frequency which is below one per revolution as a result of the positive pitch-flap coupling utilized to stabilize blade motion in the airplane mode of flight. The latter coupling and the manner in which it is utilized may be as described and claimed in U. S. Pat. No. 3,494,706.

FIG. 9 is a partial end view showing the abrasion strip 33 with fitting 70 mounted therein. Fitting 70 has a central opening 80 into which the spool 73, FIG. 10, is to be inserted with the strap pin 74 extending through the blade along the strap pin center line 81.

FIGS. 11 and 12

In order to fabricate the system, it will be understood as above indicated that the parts are secured by bonding with adhesive of the heat setting type.

The first fabrication step may be to form the spar 30 from the assembly of the abrasion strip 33, spar channels 34 and 35, inner doublers 44 and 45, and the spar web panel 40. The foregoing members are assembled and placed into a suitable fixture as shown in FIG. 11. Internal pressure bags 90 and 91 are then placed back of the panel 40 and inside of the spar 30, respectively. The pressure bags are then inflated to force the members into contact with the preformed surfaces of the bonding tool halves 92 and 93. The spar elements within the bonding tool are then placed in an autoclave where they are heated to cure the adhesive previously applied to the various confronting surfaces.

In the next step of fabrication, the honeycomb slices suitably shaped to conform with the approximate desired outer contours of the blade are adhesively secured to the inner surfaces of the upper and lower blade skins.

With the honeycomb halves 52 and 53 secured to skins 50 and 51, respectively, the spar 30 and the two skin units along with the outer doublers are placed in a bonding fixture, such as illustrated in FIG. 12, and placed in an autoclave.

The honeycomb sections 52 and 53 are made of height such that they interfere at the chord plane. The elements 95 and 96 of the bonding fixture are forced together as the fixture is closed. The cells of the honeycomb units 52 and 53 will be misaligned as they are brought together. As pressure is applied to the members 95 and 96, the ends of the honeycomb become intercised at the blade chord plane. That is, the confronting ends of the honeycombs will cross one another at angles. When they are forced together, one part will slice its way into or through an opposite part. The reaction outwardly of the honeycomb halves onto the forms 95 and 96 by the intercising action forces the upper skin 50 and the lower skin 51 into contact with the inner surfaces of the tools 95 and 96. By this means exact conformity of the blade contour to the form surfaces is assured. A bag 98 located internally of spar 30 forces the spar into engagement with the tool surfaces so that the external doublers will be forced intimately against the surface of spar 30 and over the leading edges of the skins 50 and 51. It will be noted that the skins 50 and 51 extend over the trailing edges 100 of the spar. The abrasion strip, the external doublers, and the skins are preferably adhesively secured one to the other by means of conventional adhesive materials. Thus, when the bonding fixture 95–96, FIG. 12, is placed in an autoclave and heated with the blade parts under pressure, a unitary blade is completed.

FIGS. 13 and 14

Results obtained through the use of the present invention are illustrated in FIGS. 13 and 14.

FIG. 13 has been included herein to illustrate the correlation of the hover performance with the theory involved. In FIG. 13 the thrust coefficient, $C_T$, has been plotted as abscissa with ordinates in terms of power coefficient, $C_P$. The theoretical relationship between power coefficient and thrust coefficient is represented by a solid line 121. The actual measured values of thrust coefficient are represented by the points denoted by squares and the points denoted by triangles. In test, the mast of the rotor was tilted at an angle of 75° from horizontal. The data represented by the squares in FIG. 13 was with a tip speed of 600 feet per second. The data represented by the triangles were taken at a tip speed of 740 feet per second. It will be noted that at the point where the blade would start to stall, i.e., at point 122 on curve 121, the measured thrust was about 15 percent in excess of the predeicted maximum thrust. This point is represented by point 123.

In FIG. 14, the graph illustrates the correlation of propulsive efficiency of the aircraft in the airplane mode with theory. A calculated relationship is represented by the solid line 130. The actual test results at 600 feet per second tip speed are represented by the triangles. The test results at 400 feet per second tip speed are represented by squares. The test results at 500 feet per second tip speed are represented by circles, and tests at 740 feet per second tip speed are represented by diamonds.

Propulsive efficiencies in excess of 90 percent will be noted for a considerable number of the test points.

Since the thrust required in the airplane mode is less than the thrust required in the helicopter mode, the design involves a cruise tip speed of 600 feet per second. In contrast, the total lifting power required in the helicopter mode suggests operation at the higher speed of 740 feet per second. FIG. 14 confirms correlation between the test data and theory with the theory having been generally conservative. The graph of FIG. 14 shows that the propulsive efficiency of 78 percent may be realized in level flight at this speed. The prop rotor would have an efficiency of about 92 percent in full power climb.

By the present invention, fabrication of the complex shape required for a blade having a nonlinearly varied twist and camber is made repeatable. The elongated laterally curved abrasion strip forms an unbroken front-top-bottom surface for the leading edge spar. The upper and lower spar channels inside the strip have front edges overlapping and support the spar web panel of bounded metallic honeycomb as a rear closure for the spar. Upper and lower after body skins secured at their leading edges to the upper and lower trailing edges, respectively, of the spar are coupled together along the trailing edges thereof. Honeycomb body halves are secured to and substantially coextensive with the skin with the cells oriented substantially perpendicular to the blade chord plane. Confronting ends of the cells are intercised and adhesively bonded at the blade chord plane such that the force created by intercision reacts against the skin to make it conform to a blade mold surface.

Having described the invention in connection with certain specific embodiments thereof, it is to be understood that further modifications may now suggest themselves to those skilled in the art and it is intended to cover such modifications as fall within the scope of the appended claims.

What is claimed is:

1. An aircraft propulsion blade which comprises:
   a. a leading edge spar having upper and lower trailing edges,
   b. upper and lower after body skins secured at their leading edges to said upper and lower trailing edged, respectively, of said spar and coupled together along the trailing edges thereof, and
   c. two honeycomb body halves extending rearwardly from said spar between said skins, one secured to and substantially coextensive with each said skin with the cells thereof of length to extend to planes beyond the blade chord plane and oriented substantially perpendicular to said blade chord plane and with confronting ends of said cells intercised and adhesively bonded at the blade chord plane.

2. The combination set forth in claim 1 wherein a root fitting is adhesively secured within said spar at the root of said blade.

3. The combination set forth in claim 1 wherein the rear face of said spar is adhesively secured to the front face of said honeycomb body halves.

4. An aircraft propulsion blade which comprises:
   a. an elongated laterally curved abrasion strip forming an unbroken front-top-bottom surface of a leading edge spar having upper and lower trailing edges,
   b. upper and lower after body skins secured in abutting relation at their leading edges to said upper and lower trailing edges, respectively, of said spar and coupled together along the trailing edges thereof, and
   c. two honeycomb body halves extending rearwardly from said spar between said skins, one secured to and substantially coextensive with each said skin with the cells thereof of length to extend to planes beyond the blade chord plane and oriented substantially perpendicular to said blade chord plane and with the confronting ends of said cells intercised and adhesively bonded at the blade chord plane.

5. An aircraft propulsion blade which comprises:
   a. an elongated laterally curved abrasion strip forming an unbroken front-top-bottom surface of a leading edge spar having upper and lower trailing edges,
   b. an upper spar channel inside said strip,
   c. a lower spar channel inside said strip with the front edges of said spar channels adherently overlapping,
   d. a spar web panel of bounded metallic honeycomb forming a rear closure for said spar with the honeycomb cells extending front to rear,
   e. upper and lower after body skins secured at their leading edges to said upper and lower trailing edges, respectively, of said spar and coupled together along the trailing edges thereof, and
   f. two honeycomb bodies, one secured to and substantially coextensive with each said skin with the cells thereof oriented substantially perpendicular to the blade chord plane and with the confronting ends of said cells intercised and adhesively bonded at the blade chord plane.

6. In an aircraft propulsion blade, the combination which comprises:
   a. upper and lower body skins forming outer blade surfaces, and
   b. two honeycomb body halves, one adhesively secured to and substantially coextensive with each said skin with the cells thereof of length to extend beyond the blade chord plane and oriented substantially perpendicular to said blade chord plane and with the confronting ends of said cells intercised and adhesively bonded at the blade chord plane.

* * * * *